United States Patent
Kupp

[15] 3,667,540
[45] June 6, 1972

[54] HEAT REMOVAL SYSTEM FOR NUCLEAR FUEL ASSEMBLIES

[72] Inventor: Robert W. Kupp, 227 Beechwood Road, Ridgewood, N.J. 07450

[22] Filed: Sept. 3, 1968

[21] Appl. No.: 756,882

[52] U.S. Cl. ............................165/47, 165/185, 250/106 R
[51] Int. Cl. .........................................F28f 7/00, G21h 5/00
[58] Field of Search ..............165/162, 185, 186, 47, DIG. 5; 250/106 R, 108, 106 S; 62/3

[56] References Cited

UNITED STATES PATENTS

| | | | |
|---|---|---|---|
| 2,965,819 | 12/1960 | Rosenbaum | 165/DIG. 5 |
| 2,993,080 | 7/1961 | Poganski | 62/3 |
| 3,119,933 | 1/1964 | Allen | 250/106 S |
| 3,220,471 | 11/1965 | Coe | 165/DIG. 5 |
| 3,312,277 | 4/1967 | Chitouras et al. | 165/185 |
| 3,229,096 | 1/1966 | Bonilla et al. | 250/106 X |

*Primary Examiner*—William F. O'Dea
*Assistant Examiner*—P. D. Ferguson
*Attorney*—Brumbaugh, Graves, Donohue & Raymond

[57] ABSTRACT

A system to remove heat from nuclear fuel assemblies is disclosed. Such heat removal system includes one or more units having a base and one or more plates extending outwardly therefrom, the units being adapted to fit in a nuclear fuel assembly when it is placed in a shipping cask. The plates of the heat removal device, which are formed of a heat conductive material, fit between the pins of the nuclear fuel assembly and convey heat from the assembly to the shipping cask, from whence it is removed to the atmosphere by conduction through the cask.

6 Claims, 5 Drawing Figures

INVENTOR.
ROBERT W. KUPP

BY Brumbaugh, Graves, Donohue & Raymond his ATTORNEYS

HEAT REMOVAL SYSTEM FOR NUCLEAR FUEL ASSEMBLIES

This invention relates to a heat removal system for nuclear fuel assemblies when in shipping containers or casks.

Nuclear fuel assemblies must be taken to reactors for use or from reactors for renovation or destruction after a predetermined time interval. Transportation of the nuclear fuel assemblies has presented many difficulties due to their generation of heat during transportation, sometimes over extended distances requiring long periods of time. Since the fuel assemblies are highly radioactive, large, heavy shielded casks are ordinarily used for shipping, and heat from the fuel cells must be removed during the shipping process. It is the usual practice to circulate liquid coolant through the casks to cool the fuel assemblies, but this arrangement may require pumps, heat exchangers and other units external to the casks. Consequently, occurrences may happen which interfere with circulation of such coolant through the casks, or loss of such coolant, for example, a capsized truck or derailed train or failure of any part of the system. Loss of coolant would result in an increase in temperatures within the fuel cells to a level sufficient to cause the fuel assembly pins to rupture and release hazardous fission products. For example, the heat generated within a typical fuel assembly without coolant fairly rapidly increases the interior temperatures of the fuel assembly to a level on the order of 1000° to 1500° F., temperatures sufficient to cause failure of the fuel assembly (but not through a nuclear explosion).

The present invention overcomes the aforementioned problems by providing a heat removal system that may be used alone or in combination with other cooling apparatus to prevent temperatures within the fuel assemblies from rising to dangerous levels while being transported. More particularly, the system includes one or more units made of a heat conductive material which can be inserted into a fuel assembly inside a shipping cask to absorb and convey the heat from the central regions of the fuel assembly to its perimeter where the heat can be transferred directly or indirectly to the shipping cask and eventually to the atmosphere.

Although the invention may be used together with known cooling systems as a fail-safe system, in the event of a loss of coolant or coolant circulation in the shipping cask due to an accident or failure of the primary cooling system, it can also be employed independently in certain fuel assemblies to remove heat including the residual after-heat generated by fuel cells during shipping after use in a reactor.

The above and other advantages of the present invention will be more fully understood when the following description is considered in connection with the accompanying illustrative drawings, in which.

Figure 1:
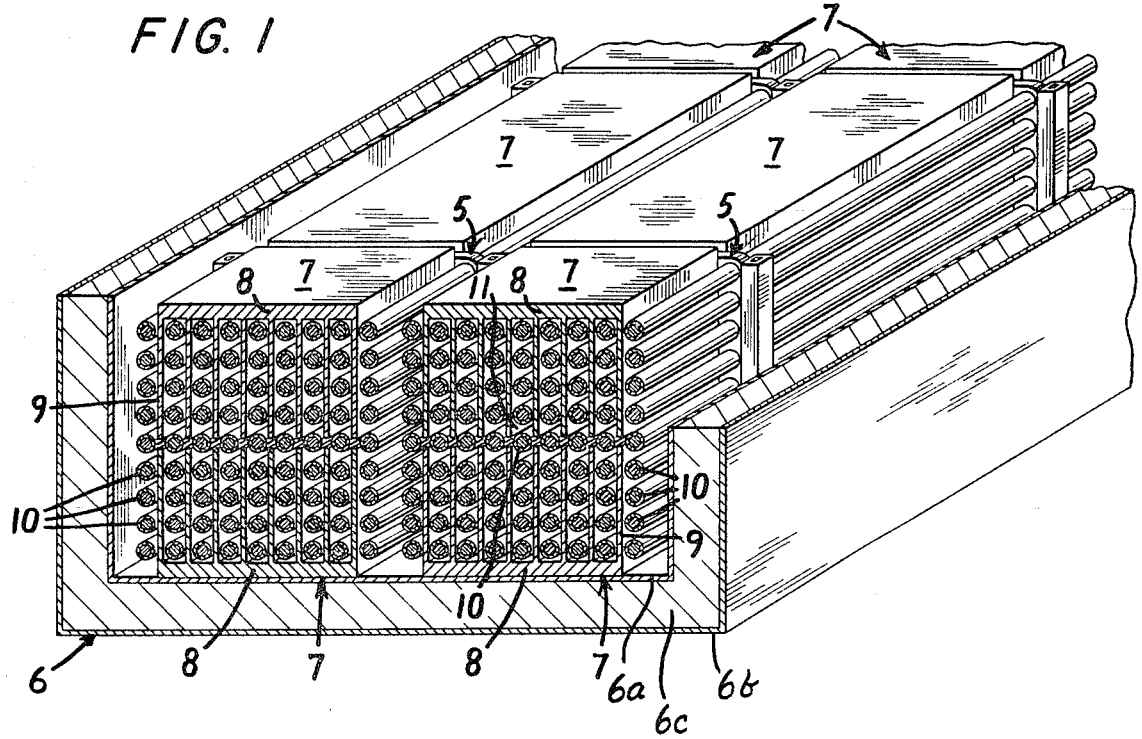
FIG. 1 is a cross-sectional view in perspective of reactor nuclear fuel assemblies in a shipping cask in which the inventive cooling system has been installed.
Figure 3:
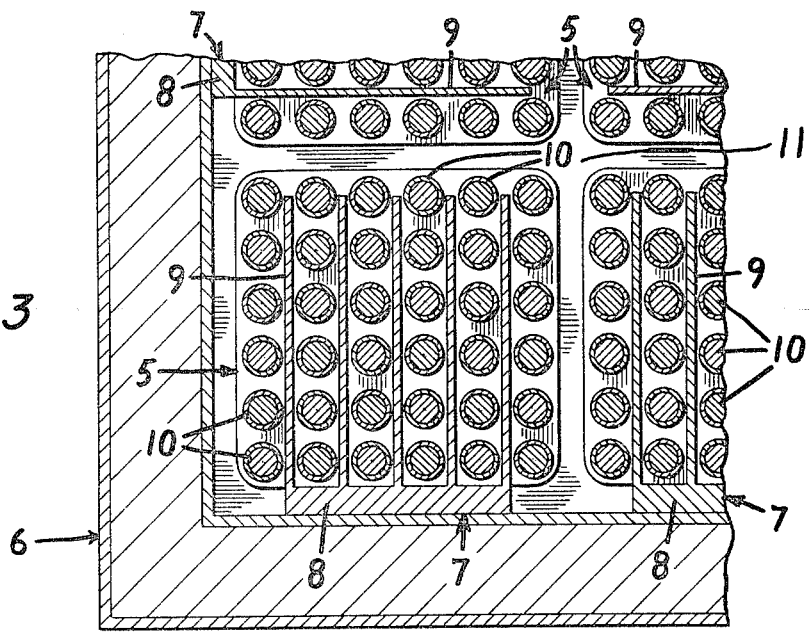
FIG. 3 is a partial cross-sectional view of a nuclear fuel assembly in a shipping cask in which an inventive heat removal system has been installed.

Referring to the drawings in detail, fuel assemblies 5 are placed in a suitably dimensioned shipping container or cask 6 having inner and outer steel walls 6a and 6b between which is sandwiched lead shielding 6c. The heat removal system includes a plurality of units 7, as shown in FIGS. 1 and 3. For clarity, the cask 6 is shown broken away and without top and end walls, but it will be understood that the fuel assemblies 5 are generally enclosed and sealed within the cask.

Figure 2:
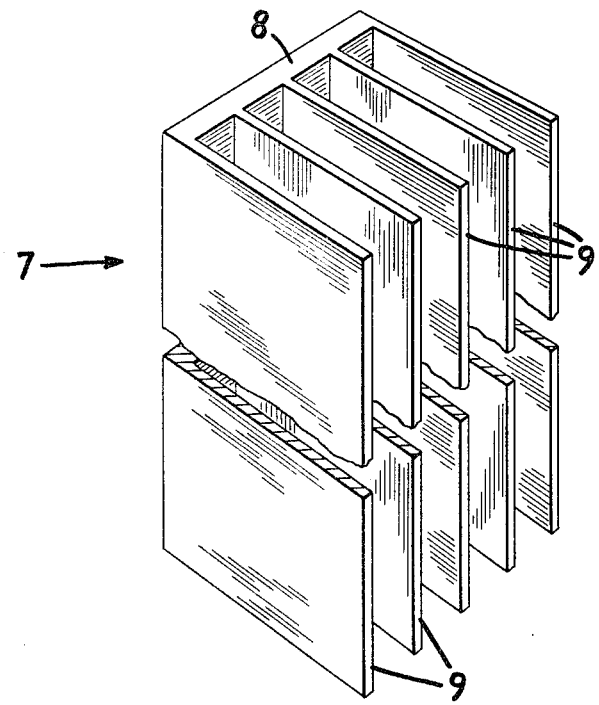
FIG. 2 is a perspective view of a typical inventive heat removal unit.

Referring to the units 7 in greater detail with particular reference to FIG. 2, each unit is formed of a heat conductive material, e.g., copper or aluminum, and in this embodiment resembles a comb with a base 8 and plates 9 extending therefrom. In the comb 7 shown in FIG. 2, the plates 9 are of equal length, but they can be of varying length, depending on the size and configuration of the nuclear fuel assembly within the shipping cask and the cooling requirements. For example, in FIG. 4 a fuel assembly 5' and heat removal combs 7' have plates 9' of unequal length.

The plates 9 of the comb 7 fit between the rows of parallel heat generating pins 10 in the nuclear fuel assembly 5. Thus, a pin 10 in an interior area 11 of the nuclear fuel assembly 5 radiates or has heat conducted to the plates 9 of the comb 7 adjacent to or contacting it. Similarly, the other pins 10 in a given row radiate or conduct heat to the same plate 9, and the heat is conveyed by the plates 9 from the central regions 11 of the nuclear fuel assembly to its perimeter. Note that physical contacts between the pins 10 and the plates 9 are not required although such contacts are advantageous and may be provided for when required.

Figure 4:
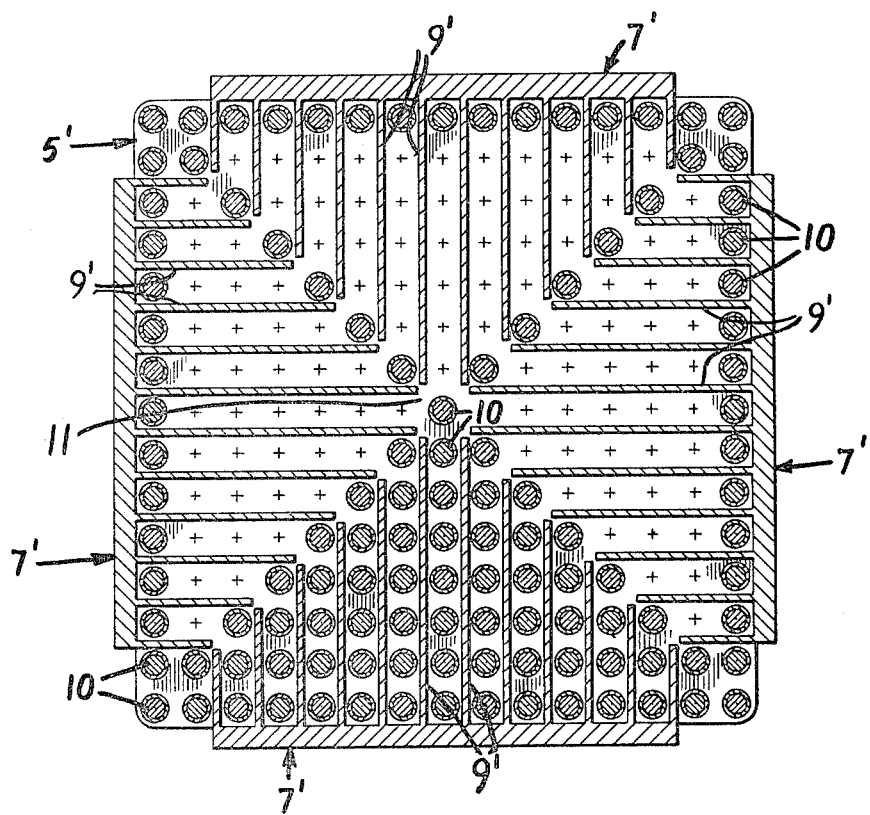
FIG. 4 is a cross-sectional view of a nuclear fuel assembly having the inventive heat removal system of a different geometric shape designed to fit and cool the illustrated nuclear fuel assembly.

In FIG. 1 the plates 9 of the heat removal comb 7 are of equal length but only extend one-half way through the nuclear fuel assembly 5, and another similar comb 7 is provided on the opposite side of such assembly. In FIG. 3, the plates 9 of the combs 7 again are of equal length, but extend the complete distance through the nuclear fuel assemblies 5 because of the different arrangement of assemblies within the shipping cask. FIG. 4 shows a typical adaptation where the plates 9' of the comb 7' are of unequal length to cool one large nuclear fuel assembly 5' within a shipping cask (not shown) requiring four separate heat removal combs.

Figure 5:
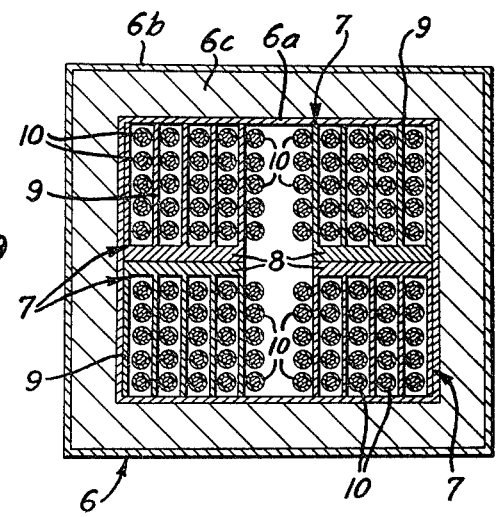
FIG. 5 is a cross-sectional view of a shipping cask in which heat removal units have been installed with their bases abutting each other in the interior portion of the cask.

The most effective and efficient way for the inventive cooling system to absorb and convey the heat, including residual after-heat, from fuel cells, is for the comb 7 to be seated flush against the inside wall of the shipping cask 6, as shown in FIGS. 1 and 3, so that the heat is transferred by contact conduction from the comb 7 to the outer wall 6b of the shipping cask 6 and then by air convection and radiation to the atmosphere. However, if the heat removal combs do not contact to the shipping cask but are merely inserted between the nuclear fuel assembly and the inside wall of the shipping cask, natural forces will cause the heat removal combs on the top and the sides of the nuclear fuel assembly to be out of contact with the shipping cask. In these cases, the transfer of heat from the comb is by liquid or gas convection and conduction as well as by radiation to the shipping cask walls. Moreover, as shown in FIG. 5, the bases 8 of the units 7 may abut each other in interior portions of the cask 6, and then conduct the heat through the bases or through separators (not shown) in the cask to its exterior walls. For example, a separator could extend between the vertical walls across the upper units 7 located in the cask 6 of FIG. 1.

In typical fuel cells, the temperature drop between one of the pins 10, in the central area 11, and the end of one of the plates 9, is relatively low, e.g., 100° F., but the value depends upon fuel assembly histories and characteristics. Other pins 10 in a given line radiate or conduct heat to the same plate 9 and a typical temperature drop between the free end of the plate and the base end of the plate is on the order of 25° F.

While the invention has been particularly described as applied to nuclear fuel assemblies as shown in FIGS. 1 and 3, it will be readily understood that the novel heat removal system may be readily adapted for use with a variety of differently configured nuclear fuel assemblies in various shipping casks. For example, it may be desirable in certain nuclear fuel assemblies to provide cooling units each comprised of a base 8 with only a single plate 9 extending outwardly therefrom. Therefore, the invention is not intended to be limited to the specific apparatus disclosed herein but is to be defined by the appended claims.

I claim:

1. A heat removal system for a nuclear fuel assembly comprising a container including an inside perimeter, a fuel assembly including at least one row of a plurality of substantially parallel fuel pin elements positioned within the container, a cooling unit including a base positioned in close proximity but not fastened to the inside perimeter of the container and further including at least one plate extending from the base to a position between the fuel pin elements, whereby heat from the fuel pin elements in proximity to the plate is absorbed by the plate and conveyed to the base, the base and plate being formed of a heat conductive material.

2. A system as defined in claim 1, wherein the plates extending from the base are equal in length.

3. A system as defined in claim 1, wherein the plates extending from the base are graduated in length, and at least four units are inserted into the fuel assembly from different directions.

4. A system as defined in claim 1, wherein the plates extend to about the middle of the fuel assembly.

5. A system as defined in claim 1, wherein the plates extend substantially through the fuel assembly.

6. A heat removal system for a nuclear fuel assembly, comprising a container having walls with inner faces that define the interior portion of the container, a fuel assembly having at least one row of a plurality of substantially parallel fuel pin elements positioned within the interior portion of the container, a cooling unit having a base with at least one plate extending therefrom to a position between the fuel pin elements, the base of the cooling unit being positioned in the interior portion of the container remote from at least one of the inner faces, and a portion of the base of the cooling unit being positioned in close proximity to another of the inner faces so that heat from the fuel pin elements in close proximity to the plate is absorbed by the plate and conveyed therethrough and through the base to the base portion that is in close proximity to the other inner face.

* * * * *